UNITED STATES PATENT OFFICE.

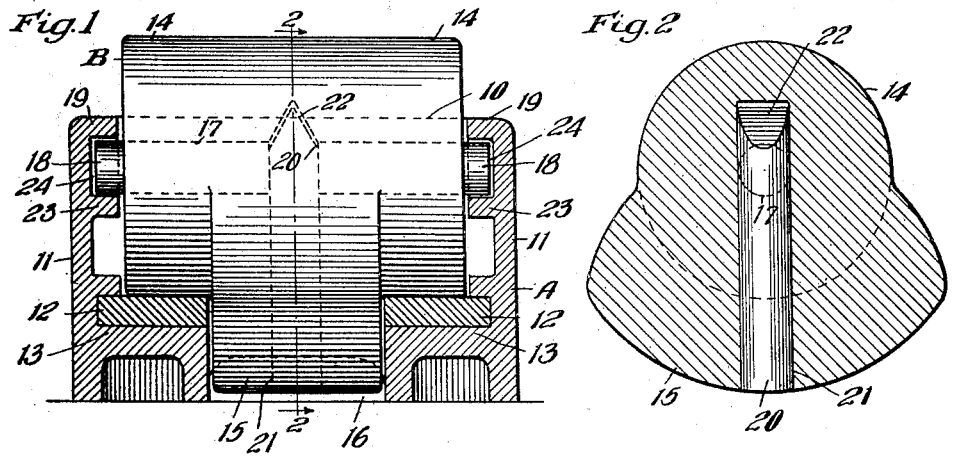
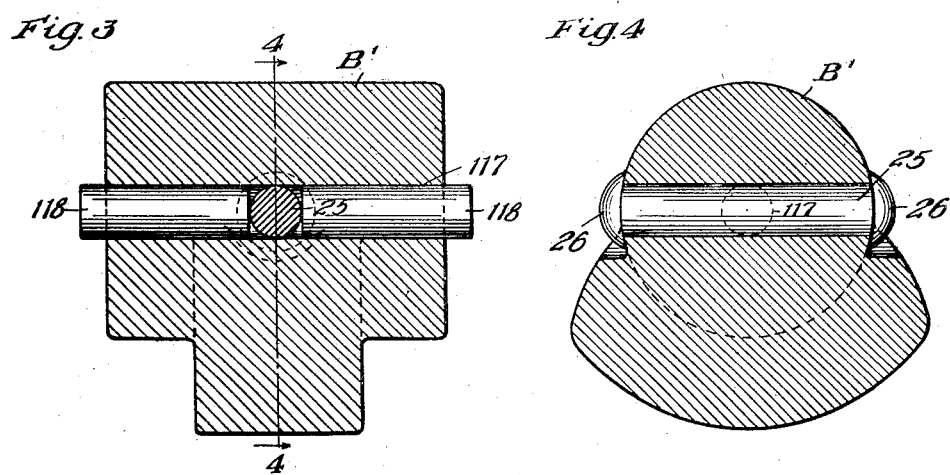

JOHN F. O'CONNOR, OF CHICAGO, ILLINOIS, ASSIGNOR TO WILLIAM H. MINER, OF CHAZY, NEW YORK.

ANTIFRICTION-BEARING.

1,357,806.　　　　　Specification of Letters Patent.　　Patented Nov. 2, 1920.

Application filed June 11, 1919. Serial No. 303,499.

*To all whom it may concern:*

Be it known that I, JOHN F. O'CONNOR, a citizen of the United States, residing at Chicago, in the county of Cook and State of Illinois, have invented a certain new and useful Improvement in Antifriction-Bearings, of which the following is a full, clear, concise, and exact description, reference being had to the accompanying drawings, forming a part of this specification.

This invention relates to improvements in anti-friction bearings.

One object of the invention is to provide a simple and efficient anti-friction bearing adapted especially for use as a side bearing for railway cars.

Another and more specific object of the invention is to provide novel means for retaining the parts in assembled relation to prevent disengagement of the parts during shipment and also to prevent tampering with the bearing when it is in service.

In the drawing forming a part of this specification, Figure 1 is a vertical transverse sectional view of a side bearing embodying my improvements. Fig. 2 is a vertical sectional view of the anti-friction element taken substantially on the line 2—2 of Fig. 1. Fig. 3 is a vertical longitudinal sectional view of an anti-friction element detached, illustrating another embodiment of my invention. And Fig. 4 is a vertical sectional view taken substantially on the line 4—4 of Fig. 3.

Referring first to the construction illustrated in Figs. 1 and 2, A denotes a housing or retaining member for the anti-friction element and B the anti-friction element itself. The housing A is preferably made of substantially rectangular formation having end walls 10, side walls 11—11 and horizontal laterally-spaced bearing surfaces 12—12 preferably in the form of steel inserts mounted on suitable shelves or ledges 13—13 of the housing A.

The anti-friction element B comprises a true cylindrical section 14 adapted to roll back and forth on the bearings 12 and a depending combined counter weight and centering section 15, the latter being adapted to operate in the longitudinal recess 16 provided in the housing A between the bearings 12—12, as clearly indicated in Fig. 1. The structure above described is disclosed more fully in prior co-pending applications of mine and I do not deem it necessary to enter into any more detailed description thereof.

In order to hold the parts in assembled relation, I employ the following means: The anti-friction member B is provided with an axially extending opening 17 and in said opening 17 I insert two pins 18—18, the combined length of said two pins 18, or half pins—as they may be termed—being not greater than the length of the anti-friction element B. With this arrangement, it is evident that the pins 18 may be inserted within the element B and the latter, with said pins slipped down into place between the inturned flanges 19—19 of the housing. After the anti-friction element B has been thus positioned, I insert a radially extending pin 20 through a suitable radially extending opening 21 in the element B. This pin 20 is preferably wedge-shaped at its upper end, as indicated at 22, and is driven in with a tight wedging fit from the bottom of the element B. The insertion of the pin 20 obviously will separate the pins 18—18 and project their ends beyond the ends of the element B and always maintain this condition. This results in the outer ends of the pins 18 always lying under the inturned flanges 19 of the housing so that it is impossible to remove the anti-friction element B unless the spreading pin 20 is first removed. If desired, the side walls 11 of the housing A may be provided with additional inwardly extending flanges 23 below flanges 19 so as to form, in effect, longitudinally extending guides or grooves 24 for the pins 18.

In the construction shown in Figs. 3 and 4, the anti-friction element B′ is made substantially the same as that shown in Figs. 1 and 2—that is, it is provided with a true cylindrical rolling section and a depending combined counter weight and centering section and an axially extending opening 117. Two pins, or half-pins, 118—118 are also employed, the combined length of which is not greater than the length of the anti-friction element B′. Said pins 118 and the anti-friction element B′ are assembled and inserted in the same manner as previously described for the construction shown in Figs. 1 and 2.

To hold the pins 118 separated,—that is, with their ends projecting beyond the ends of the anti-friction element B', I use a rivet 25 extending diametrically through the roller section B' and preferably horizontally when said element B' is in its normal position, as shown in Fig. 4. Said rivet 25 is headed at both ends, as indicated at 26—26, and when thus headed it is evident that the various parts of the side bearing cannot be disassembled without destroying or removing the rivet 25. With the construction shown in Figs. 3 and 4, the rivet 25 will be applied with the anti-friction element B' turned through an angle of 90° from its normal position, so as to permit the use of the riveting tools on the top and bottom of the rivet 25 when said element B' is in the position mentioned.

Although I have herein shown and described what I now consider the preferred manner of carrying out my invention, the same is merely illustrative, and I contemplate all changes and modifications that come within the scope of the claims appended hereto.

I claim:

1. In an anti-friction bearing, the combination with a housing and an anti-friction element movable back and forth therein, of means for retaining said element and member in assembled relation, said means comprising, a sectional pin carried by and extending axially of and within said element with the ends thereof extended beyond the ends of the element, projections on said housing overlying said extended ends of the pin, and a pin-like spreader rigidly mounted in said element and passing between the sections of the pin to hold the latter in their extended position.

2. In an anti-friction bearing, the combination with a housing having side walls, of an anti-friction element adapted to roll back and forth within said housing between the side walls thereof, a pin comprised of sections the combined length of which is less than the distance between those portions of the side wall between which the anti-friction element is inserted, and means, applicable after the element has been inserted within the housing, for holding the sections of said pin separated with their outer ends projecting beyond the ends of the anti-friction element and beneath overlying flanges of the housing, said means being carried by the element and rigid with respect thereto.

3. In an anti-friction bearing, the combination with a hollow housing having side walls provided with inturned flanges at the top thereof, of an anti-friction element having a cylindrical rolling section, said cylindrical section having an axially extending opening, a two-part pin mounted within said opening, the combined length of the parts of said pin being less than the space between said inturned flanges of the housing whereby the anti-friction element carrying said pins may be inserted within the housing, and a spreader carried by the anti-friction element and extending radially thereof and adapted to pass between the inner ends of the sections of the retaining pin to hold the latter separated after the anti-friction element has been assembled with the housing and with the outer ends of the sections of the pin positioned beneath said flanges of the housing.

In witness that I claim the foregoing I have hereunto subscribed my name this 14th day of May, 1919.

JOHN F. O'CONNOR.